Oct. 7, 1969  R. E. QUIGLEY, JR., ET AL  3,471,274
HYDROGEN-OXYGEN FUEL INTERNAL COMBUSTION ENGINE
Filed Oct. 28, 1966
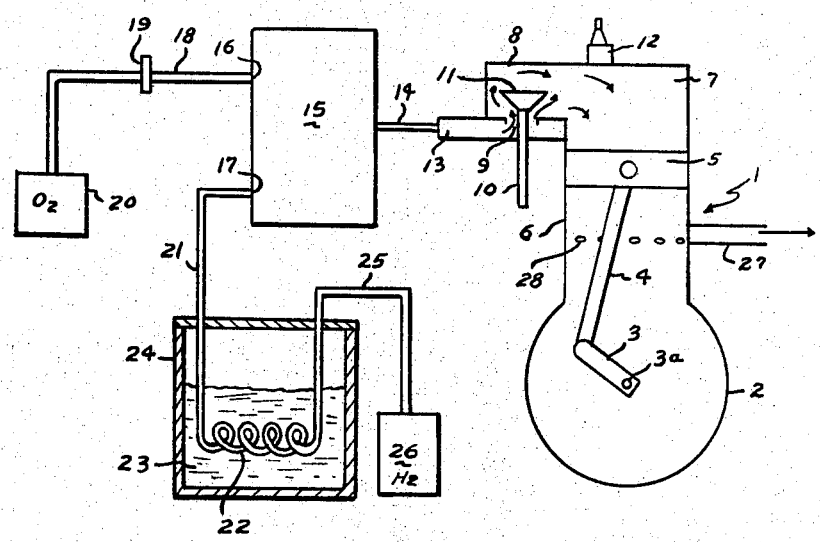
INVENTOR.
RICHARD E. QUIGLEY, JR.
GEORGE N. MEDISCH
BY *Harry A. Herbert Jr*
*Herbert H. Brown* and
ATTORNEYS 3,471,274
HYDROGEN-OXYGEN FUEL INTERNAL
COMBUSTION ENGINE
Richard E. Quigley, Jr., Centerville, and George N. Medisch, Dayton, Ohio, assignors to the United States of America as represented by the Secretary of the Air Force
Filed Oct. 28, 1966, Ser. No. 591,062
Int. Cl. B01f 3/20, 3/02; C10l 3/00
U.S. Cl. 48—180        5 Claims

ABSTRACT OF THE DISCLOSURE

The present invention relates to internal combustion engines which operate with a fuel mixture of oxygen and hydrogen, and in which the mixture is cooled well below ambient temperature before being introduced into the combustion chamber.

---

The invention described herein may be manufactured and used by or for the United States Government for governmental purposes without the payment to us of any royalty thereon.

Prior to this invention, oxygen and hydrogen have been introduced as a mixture into the combustion chamber through separate cam-operated valves. The result was that when these engines are operated according to the Otto cycle, they produce severe detonations. The combusted gas movements would tend to scrub the cylinder walls of the lubricant and cause over-heating of the combustion chamber walls. Backfiring of the charge through the manifold, caused by localized excessive heat zones in the cylinder walls may also be present, which gives rise to overheating of the valves. These heated spots often would cause premature igniting of the gases. From the operation standpoint, an engine of this character runs rough and uneven, is hard to start, and exhibits considerable loss of power.

These difficulties do not appear to lie in any variation from an optimum ratio between the hydrogen and the oxygen content or the compression ratio, but instead, appear to be due to a high flame speed within the combustion chamber.

Various proposals have been made to eliminate these dangerous backfirings, for example, it has been proposed to introduce flame arresters in the induction passage of the manifold. However, the pressure wave created by the blowback would hurl these arresters out of position. Increasing the hydrogen flow (thus enriching the mixture ratio) or the coolant water flow (which lowers head temperatures) appears to increase the missing effect of the engine drastically.

In accordance with our invention, we have discovered that this rate of flame speed can be reduced in a degree sufficient to provide satisfactory performance of the engine without the use of the aforesaid arresters or without requiring any critical ratio of the hydrogen to the oxygen.

An object of the invention is to provide an improved method and structure by which the flame speed can be controlled in an internal combustion engine utilizing hydrogen-oxygen fuel.

A more specific object is to provide an improved engine of the type mentioned and in which the combustion takes place evenly through the power generating portion of the cylinder, with no hot spots or backfiring of the explosions.

However, a more general object is to improve the operating characteristics of a hydrogen-oxygen engine by eliminating the various causes for departure from the ideal Otto cycle law of constant volume combustion so as to provide a longer operating life and optimum power.

These objects are carried out in brief by introducing a cold and already mixed gas into the combustion chamber which tends to reduce the rate of the explosion of each charge and also to eliminate any localized heated zones in the walls of the chamber which would tend to increase the speed of the flame during combustion. This cold gas mixture is obtained apart from the engine by subjecting one of the propellants to a cryogenic heat sink and then combining the latter with the other gas to provide a very cold mixture of hydrogen and oxygen in the optimum proportions.

The invention will be better understood when reference is made to the following description and the accompanying drawing in which the figure shows, in diagrammatic form, the improved structure and method for attaining the results set forth.

In the figure, reference character 1 generally designates by diagram the outline of an automotive engine of well-known design. Only those parts of the engine are shown in detail which are concerned with the invention. It will be understood that the engine has the usual crank shaft, flywheel, timing gears and valve lifting levers, also a suitably positioned water jacket, water pump and oil pressure connections. The crankcase is indicated at 2 and a rotatable crank is shown at 3 which is secured to a crankshaft 3a. A rod 4 is connected between the crank to a pintle in a piston 5. The latter may have piston rings (not shown). The crankcase carries an upright cylinder 6 at the top position, the upper portion of which serves as a combustion chamber 7. The latter is provided with a horizontal rectangularly shaped extension 8 having an inlet opening 9 along the bottom surface. A stem 10, carrying an inlet valve 11 at the top, reciprocates in this opening. The valve has a tapered periphery which can fit snugly within a valve seat of similar shape and formed about the opening 9. The stem 10 is adapted to be moved vertically by a suitably positioned cam-operated rod (not shown) which is precisely timed by the usual gears. A spark plug 12 is threaded into the top of the combustion chamber. These is an opening in the lower wall of the manifold 13 which serves as a vertical support for the valve stem. The outer end of the manifold is closed except for an opening which receives a conduit 14.

A mixing tank, which could take the form of a carburetor in a standard engine is indicated at 15. This tank is provided with a pair of inlet openings 16, 17, the upper one of which leads by conduit 18 through an adjustable orifice device 19 of any suitable and well-known type to a source of oxygen 20. The latter is in the gaseous form and under high pressure. The lower opening 17 is connected through a conduit 21 to a coil 22 immersed in a bath 23 of liquid nitrogen contained in a closed tank 24. Well known provisions are provided to maintain an adequate filling of the liquid in the tank and also to vent the nitrogen gas. The other end of the coil is connected through a conduit 25 to a source of high pressure hydrogen 26 in gaseous form.

It is apparent that the oxygen and the hydrogen are caused to flow through their respective conduits into the tank 15 where these elements are combined as a homogeneous mixture. This mixture is caused to flow through the conduit 14 and manifold 13 when the valve 11 is lifted during the intake stroke of the piston. A four-stroke cycle engine can be advantageously employed, and assuming that the ignition at spark plug 12 has been properly timed through the usual type of gearing, combustion of the mixture will occur at practically constant volume (Otto cycle). Since the power stroke exists for only a part of the total time of the cycle, a flywheel (not shown) is used to smooth out the power pulses and so obtain, essentially, a uniform rotation of the crankshaft. A vacuum exhaust pump (not shown) is preferably connected to the exhaust pipe 27 to remove the products of combustion when the exhaust ports 28 are uncovered by the piston.

OPERATION OF THE IMPROVED GAS INTAKE

In accordance with our invention we supply the combustion chamber with a cold homogeneous mixture of hydrogen and oxygen in order to avoid the preignition problems and to reduce the flame speed such that there are no detonations present. The mixing operation is performed apart from the engine and specifically within the tank or pot 15 and at a pressure of preferably 153 p.s.i. gage. The tank can, of course, be structurally attached to the engine for manufacturing reasons. Essentially, it operates from the mixing standpoint entirely separate from the engine in order to assure a high degree of homogeneity before the fuel is introduced into the combustion chamber.

The oxygen at source 20 is in the gaseous form and at ambient temperature. The volume or rate of flow of the oxygen into the mixing chamber can be regulated at the orifice 19. The hydrogen source 26 is passed through a liquid nitrogen bath at the tank 24. The nitrogen is maintained at about −320° F. and the hydrogen emerges from the tank at a temperature of about −300° F.

After passing through the cooling device, the gas flows into the mixing pot 15 in order to be thoroughly mixed with the introduced oxygen. The gaseous mixture has a temperature in the preferred regime of −258° F. or even colder depending on the ratio of oxygen to hydrogen as controlled by the orifice 19. It was shown during tests that the lower the input temperature of the gas mixture the greater decrease was obtained in the severity of detonations of the engine during operation.

The cold gas mixture, upon reaching the combustion chamber is at a cryogenic regime of less than −190° F. at which temperature it tends to cool the walls of the chamber so as to eliminate any local hot spots which could bring on preignition. The cold condition of the gas definitely reduces the severity of detonation during combustion so that there is little or no backfire to ruin the valves by overheating. The overall result is that the engine operates quieter and has a longer operating life than the prior oxygen-hydrogen engine in which a mixture of gases is introduced into the combustion chamber at ambient temperature.

While a certain specific embodiment has been described, it is obvious that numerous changes may be made without departing from the general principle and scope of the invention.

We claim:
1. In the art of eliminating local hot spots in the explosion walls of an internal combustion engine which operates on a mixture of oxygen and hydrogen, the step of mixing the oxygen and hydrogen before introducing the fuel into the combustion chamber, and the further step of cooling one of the gases to a relatively low temperature prior to the mixing operation in order to introduce the gaseous mixture in a cold state into the combustion chamber.

2. The method according to claim 1 and in which the hydrogen content is cooled to the cryogenic regime of below −190° F.

3. In an internal combustion engine operating on the combined explosive effect of oxygen and hydrogen, means for eliminating local hot spots in the walls of the combustion chamber during the explosion, said means including a tank external of the combustion chamber of the engine and within which the two gases are mixed for introduction into said chamber, means for cooling one of said gases to a temperature considerably below ambient temperature prior to forming the mixture whereby the mixture is introduced into the combustion chamber in a relatively cold state in order to reduce the rate of flame speed within the chamber.

4. Apparatus according to claim 3 and in which said cooling means operates only on the hydrogen component of the mixture.

5. Apparatus according to claim 4 and in which said cooling means operates to lower the temperature of the hydrogen prior to mixing to a temperature such that the temperature of the mixture will be less than −190° F.

References Cited
UNITED STATES PATENTS

| | | |
|---|---|---|
| 1,275,481 | 8/1918 | Seymour. |
| 3,232,050 | 2/1966 | Robinson et al. _____ 60—36 |

U.S. Cl. X.R.

MORRIS O. WOLK, Primary Examiner

R. E. SERWIN, Assistant Examiner

U.S. Cl. X.R.
60—36; 123—1, 119